United States Patent
Mund et al.

(10) Patent No.: US 6,721,846 B2
(45) Date of Patent: Apr. 13, 2004

(54) SYSTEM AND METHOD OF PROVIDING DATA IMAGES OVER A NETWORK WITH A LOCAL IMAGE CACHE

(75) Inventors: Keith L. Mund, Sioux City, IA (US); Jonathan Johansen, South Sioux City, NE (US)

(73) Assignee: Gateway, Inc., Poway, CA (US)

( * ) Notice: Subject to any disclaimer, the term of this patent is extended or adjusted under 35 U.S.C. 154(b) by 344 days.

(21) Appl. No.: 09/750,900

(22) Filed: Dec. 28, 2000

(65) Prior Publication Data

US 2002/0099911 A1 Jul. 25, 2002

(51) Int. Cl.$^7$ ............................................. G06F 12/00
(52) U.S. Cl. ....................... 711/118; 711/129; 345/557
(58) Field of Search ............................... 711/100, 118, 711/129, 130, 136, 154; 345/557, 530

(56) References Cited

U.S. PATENT DOCUMENTS

| | | | |
|---|---|---|---|
| 4,714,992 A | | 12/1987 | Gladney et al. |
| 5,694,570 A | * | 12/1997 | Beardsley et al. ........... 711/112 |
| 5,887,163 A | | 3/1999 | Nguyen et al. ............. 395/652 |
| 5,936,616 A | * | 8/1999 | Torborg, Jr. et al. ........ 345/202 |
| 5,974,547 A | | 10/1999 | Klimenko ...................... 713/2 |
| 5,991,542 A | | 11/1999 | Han et al. .................... 395/712 |
| 6,012,130 A | | 1/2000 | Beyda et al. ................. 711/173 |
| 6,080,207 A | | 6/2000 | Kroening et al. ............. 717/11 |
| 6,092,155 A | * | 7/2000 | Olnowich ................... 711/142 |
| 6,101,576 A | * | 8/2000 | Kobayashi et al. .......... 711/122 |
| 6,108,697 A | | 8/2000 | Raymond et al. ........... 709/218 |

FOREIGN PATENT DOCUMENTS

| | | |
|---|---|---|
| GB | 2317302 A | 3/1998 |
| WO | WO 01/35629 | 5/2001 |

OTHER PUBLICATIONS

Disk Image Creation and Restoration http://web.archive.org/web/2001...bo.com/docs/rembo/imaging. (c) 1999–2000 Copyright Rembo Technology Sarl—XP–002217929.

Drive Image 2.02; wysiwyg://16/http://access.nerac.com/WNDABSM; Sep. 14, 2000.

Minimize the hazards of trying Windows 2000; wysiwyg://13/http://access.nerac.com/WNDABSM; Sep.14, 2000.

Archive and migrate entire disk drives; wysiwyg://27/http://access.nerac.com/WNDABSM; Sep. 14, 2000.

Computer museum achieves feat of CD–ROM networking: sharing 40 multimedia titles without CD–ROM drives; Logicraft's "Virtual CD–ROM" provides solution originally deemed impossible; http://acc...WNDABSM?SESSION=D787EE21001401DB&STITEM=0021&SCROLL=NEX; Oct. 9, 2000.

DiscPortVT; http://acc.../WNDABSM?SESSION=D787EE21001401DB&STITEM=0004&SCROLL=BAC; Oct. 9, 2000.

Network–attached storage market is poised to take off; http://acc.../WNDABSM?SESSION=D787EE21001401DB&STITEM=0003&SCROLL=BAC; Oct. 9, 2000.

(List continued on next page.)

Primary Examiner—Tuan V. Thai
(74) Attorney, Agent, or Firm—Scott Charles Richardson; Jeffrey A. Proehl; Leonard & Proehl, Prof. LLC

(57) ABSTRACT

The present invention is directed to a system and method of providing a data image cache. A system suitable for transferring data images includes an image cache suitable for being accessed locally, the image cache suitable for storing at least one data image. Image storage is connected to the image cache over a network, the image storage including a plurality of data images. Wherein, a query is received by the image cache for a data image not included in the image cache, a data image corresponding to the queried image is transferred from the image storage to the image cache over the network.

24 Claims, 4 Drawing Sheets

OTHER PUBLICATIONS

UK—Logicraft Unveils Virtual CD–ROM for PC Users Dec. 9, 1996; http://acc.../WNDABSM?SESSION=D787EE21001401DB&STITEM=0006&SCROLL=NEX; Oct. 9, 2000.

RetroChron: here's a winner for continuous–operation backups. (Hardware Review) (evaluation); http://acc.../WNDABSM?SESSION=D787EE21001401DB&STITEM=0010&SCROLL=NEX; Oct. 9, 2000.

* cited by examiner

SYSTEM AND METHOD OF PROVIDING DATA IMAGES OVER A NETWORK WITH A LOCAL IMAGE CACHE

FIELD OF THE INVENTION

The present invention generally relates to the field of unit testing of information handling system components and provision of data images, and particularly to a data image cache.

BACKGROUND OF THE INVENTION

The assembly and manufacture of information handling systems and components is extremely competitive, even slight advantages return significant gains when multiplied over the vast quantities of units sold. One important factor in the purchase of an information handling system by a consumer is the reliability of the system. To insure this reliability, manufacturers and assemblers test components and systems for operability within desired parameters. For example, unit testing of individual information handling system components, such as PCI components and the like, typically involves installing a driver for the component and rebooting. This may be prone to inconsistent results caused by a poor or incorrect installation, remnants of other drivers and installations, and the like. These inconsistent results may cause an inoperable information handling system and/or components being shipped, thereby greatly increasing the cost to the manufacturer in the return and repair of the system as well as resulting in great inconvenience to the consumer.

One way to promote efficient and effective testing of the components is to create a data image for each test. The data images may be stored for access by devices needing the data image, such as on a master system that is accessible by each testing device in a device testing system. However, due to the size of the data images, for example, a data image size may be 100 Mb and greater, it may take a considerable amount of time to transmit the data images over a network.

Thus, it would be desirable to provide an image system and method that may reduce the time and network traffic required in transferring a data image.

SUMMARY OF THE INVENTION

Accordingly, the present invention is directed to a system and method of providing a data image cache. In a first aspect of the present invention, a system suitable for transferring data images includes an image cache suitable for being accessed locally, the image cache suitable for storing at least one data image. Image storage is connected to the image cache over a network, the image storage including a plurality of data images. Wherein, a query is received by the image cache for a data image not included in the image cache, a data image corresponding to the queried data image is transferred from the image storage to the image cache over the network.

In a second aspect of the present invention, a method for storing data images includes receiving a request for a data image. An image cache is queried for the requested data image, wherein if the data image is not included in the image cache, image storage is queried for the requested data image. The image storage is connected to the image cache over a network. The requested data image is transferred to the image cache from the image storage, wherein when there is insufficient storage space to store the requested data image on the image cache, a preexisting data image is deleted.

In a third aspect of the present invention, a system for transferring data images includes an information handling system including an image cache suitable for being accessed locally. The image cache is suitable for storing at least one data image. An image server including image storage is connected to the information handling system over a network. The image storage includes a plurality of data images. Wherein a plurality of data images transferred from the image server are utilized by the information handling system, a first data image is stored on the image cache which is utilized more recently by the information handling system than a second data image.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown. Unit testing of individual information handling system components, such as PCI components and the like, typically involves installing a driver for the component and rebooting. This may be prone to inconsistent results caused by a poor or incorrect installation, remnants of other drivers and installations, and the like. One way to promote efficient and effective testing of the components is to create a data image for each test. A data image may include a representation, duplicate, copy, and the like of all or part of a hard or floppy disk, a section of memory or hard drive, a file, a program, or data, and the like as contemplated by a person of ordinary skill in the art. The data images may be stored, to be accessible by devices configured to utilize the data image. For example, the data image may be stored on an image server that is accessible by each testing device in a device testing system. Due to the size of the data images, it may take a considerable amount of time to transmit the data images over a network. For instance, a data image, which may include an operating system and other executable software, may be 100 Mb and greater. Thus, it would be desirable to provide an image system and method that may reduce the time and network traffic required in transferring the data image.

Figure 1:
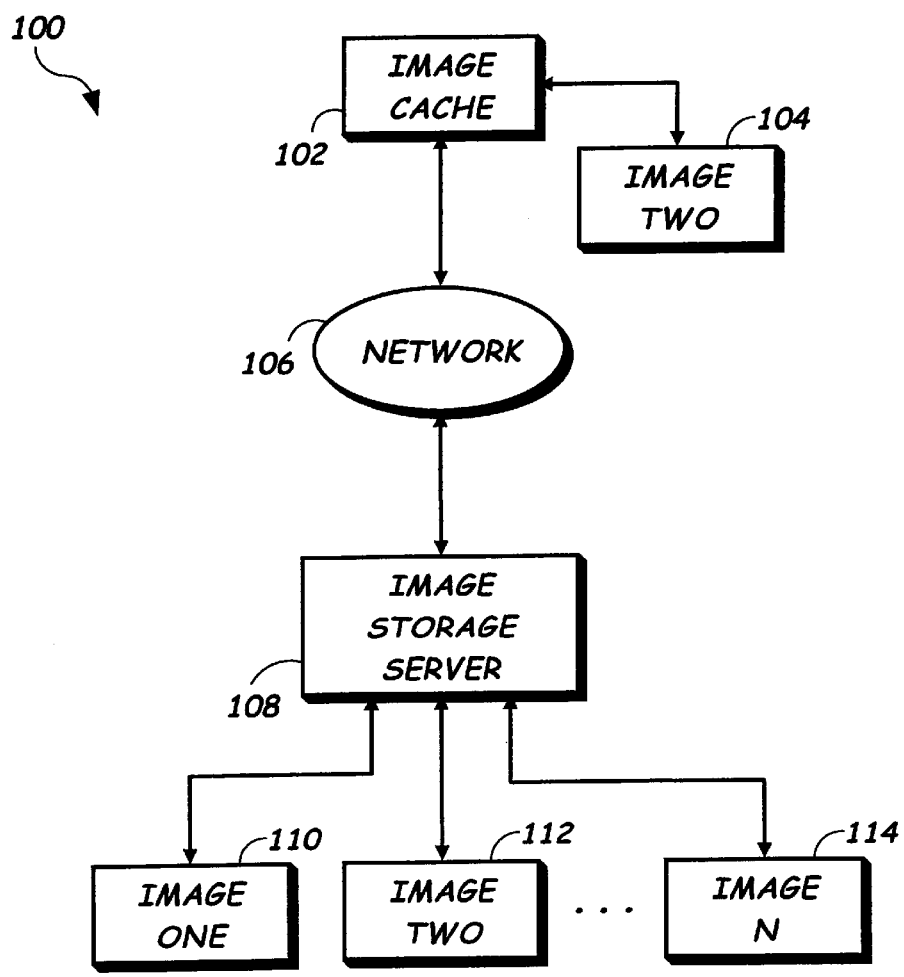
FIG. 1 is a diagrammatic block plan of an exemplary embodiment of the present invention wherein a system including a image cache and image storage is configured for providing data images.

Referring now to FIG. 1, an exemplary embodiment of the present invention is shown wherein a system is configured for providing data images. Preferably, a data image includes an operating system image as well as any other desired software to be utilized so that the image may be utilized in its entirety without the need of partial loading of software components, such as drivers and the like. For example, a data image may include a program of instructions including operating system and test software configured to perform a test on a component and/or information handling system. Thus, the image is a complete program of instruction so that once loaded, the information handling system includes the necessary software needed to perform the targeted task, without the problems of partial loading as previously experienced.

An image system 100 may include an image cache 102 configured to store a data image 104, to enable the data image to be utilized locally, such as by an information handling system to load software, perform component tests, and the like. The image cache 102 is configured to store data images received from image storage 108 over a network 106, such as a local area network (LAN), wide area network (WAN), Internet, and the like. A plurality of data images 110, 112 & 114 are stored in image storage 108 that may be transferred to the image cache 102 as desired. Thus, a large quantity of data images 110, 112 & 114 may be stored by an image storage server 108 over a network 106, with the most relevant of the data images stored locally in an image cache 102. In this way, a large storage system may be utilized remotely to contain a plurality of data images and transfer desired data images to a local cache to be utilized as desired.

Figure 2A:
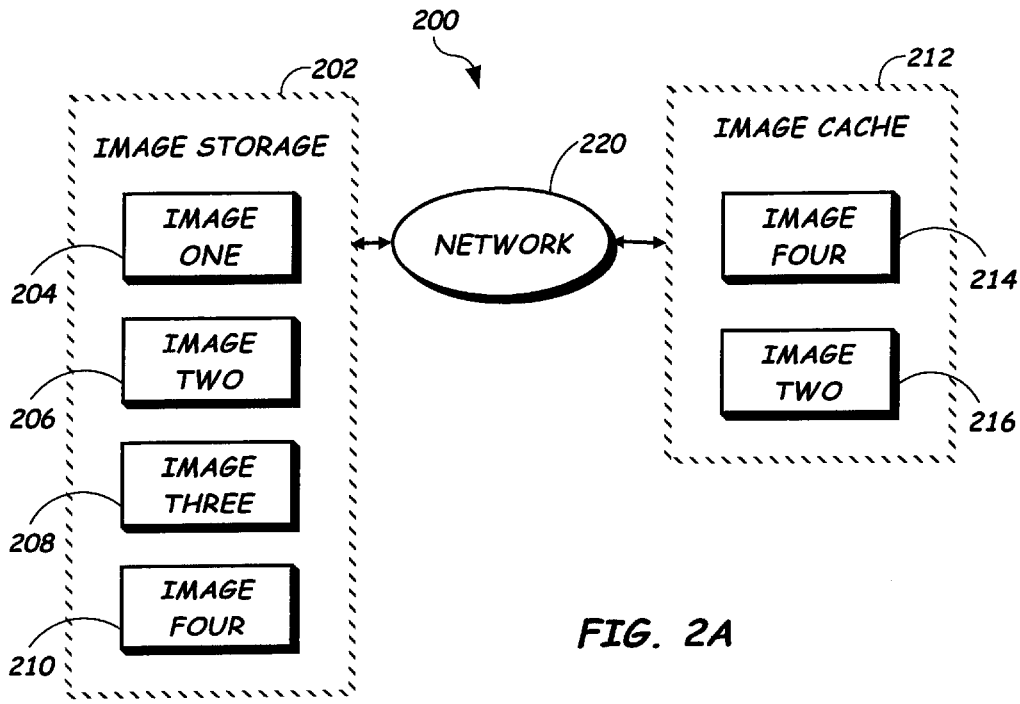
FIG. 2A is a diagrammatic block plan of an exemplary embodiment of the present invention wherein data images are stored both locally in an image cache and remotely in image storage coupled to the image cache over a network, the data images being suitable for transfer over the network.
Figure 2B:
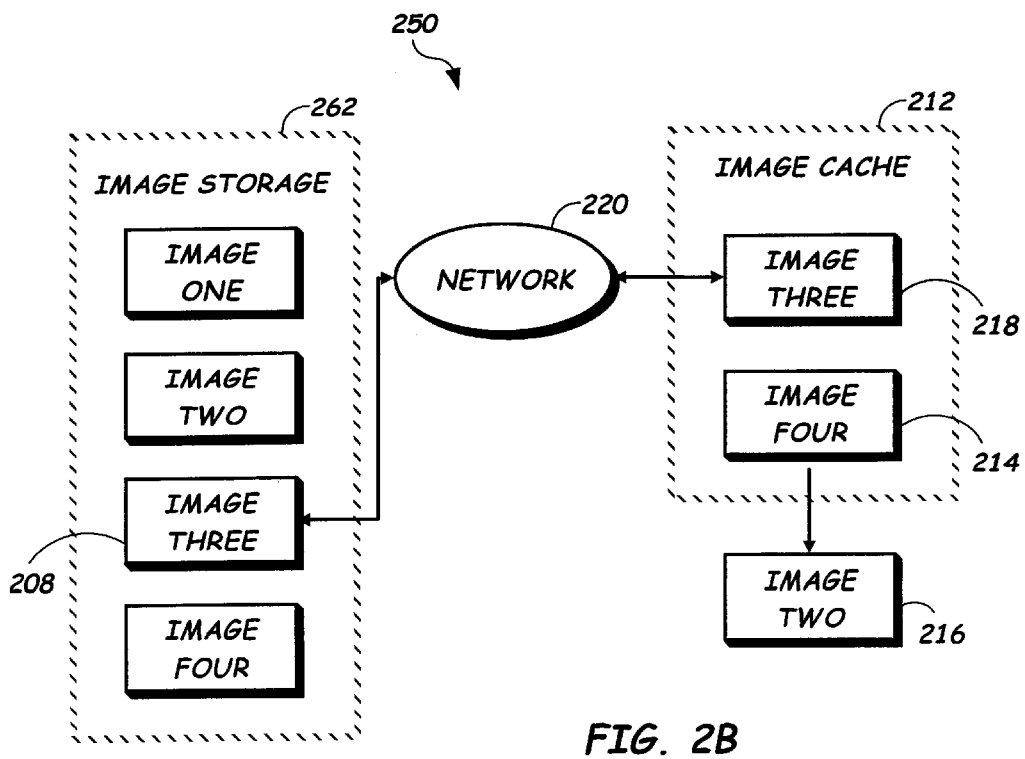
FIG. 2B is a diagrammatic block plan of an exemplary embodiment of the present invention wherein a data image transferred from image storage to an image cache over a network displaces a preexisting image included in the image cache.

Referring now to FIGS. 2A & 2B, exemplary embodiments 200 & 250 of the present invention are shown wherein data images are stored both locally and remotely over a network and are suitable for being transferred over the network. Image storage 202 may be utilized to store a plurality of data images, in this instance depicted as data image one 204, data image two 206, data image three 208 and data image four 210. An image cache 212 is connected to the image storage 202 over a network 220. The image cache 212 includes copies of data images four 214 and two 216. Data images may be stored in the image cache 212 for a variety of reasons, such as for access by an information handling system. Data images may be stored and saved to the image cache utilizing a variety of protocols so that the most desirable data image is accessible through the image cache 212 and thus, does not have to be transferred from image storage 202 over the network 220. For instance, protocols utilized to save data images to the image cache may include saving the most recently used data image, least recently utilized data image, and the like. One way to accomplish and coordinate the various protocols is facilitated by including an identifier with each data image or group of data images to indicate the utilization of the data image. For example, the identifier may indicate when the data image was last accessed, the number of times the data image was accessed in a given period of time, and the like. Thus, the most desirable data images may be accessed locally from the image cache, with the least needed data images stored remotely from the system.

For example, the image cache 212 may include copies of data image four 214 and data image two 216, which in this instance were the most recently utilized data images copied from data image two 206 and data image four 210 included in image storage 202. However, the image cache 212 may receive a request for image three 208, which is not locally available in the image cache 212. Thus, as shown in FIG. 2B, data image three 208 may be retrieved from image storage 262 over the network and a copy of data image three 218 stored in the image cache 212. If there is insufficient room to store copied data image three 218 in the image cache 212 along with copied data image four 214 and copied data image two 216, one or more of the preexisting data images may be deleted from the image cache 212 to provide sufficient space. For example, data image two 216 may be deleted from the image cache 212 based on a comparison between copied data image two 216 and copied data image four 214. Such a comparison may be based on an identifier included on the respective data images and performed based upon a variety of desires of a user of the system. For example, it may be desirable to delete the data image accessed the least number of times, delete the data image which has not been accessed for the longest period of time, and the like as contemplated by a person of ordinary skill in the art.

Figure 3:
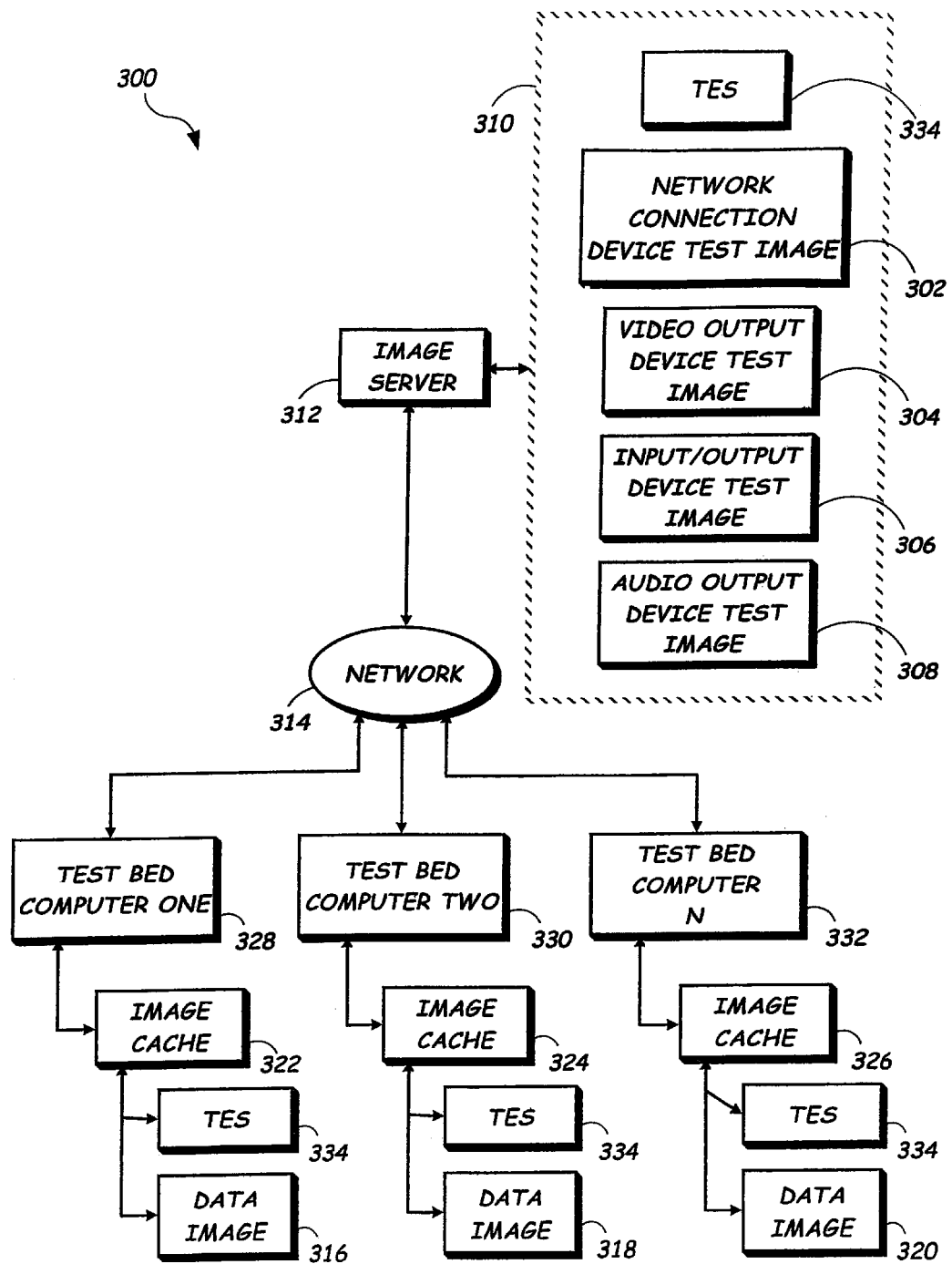
FIG. 3 is a diagrammatic block plan of an exemplary embodiment of the present invention wherein a test system utilizing an image cache, image storage and data images of the present invention is suitable for providing improved testing results with lower network resources being utilized.

Referring now to FIG. 3, an exemplary embodiment 300 of the present invention is shown wherein a test system utilizing an image cache and image storage of the present invention is suitable for providing improved testing results with lower network resources being utilized. Data images 302, 304, 306 & 308 may be included on partitions on a hard disk 310 and/or disk array included on an image server 312. Thus, in this instance, image storage is configured as part of an image server 312 that may be accessed over a network 314. Each data image 302, 304, 306 & 308 on the plurality of partitions of the image server 312 includes an identifier, such as a label, to identify the specific data image and/or its desired function. Thus, once a specific need is identified a corresponding data image 316, 318 & 320 may be retrieved from image caches 322, 324 & 326 located on the information handling systems, such as testing computers 328, 330 & 332, or over the network 314 from the image server 312.

One of the partitions included on the image server and/or information handling system may be configured as a controlling partition 334. The controlling partition includes a specialized program of instructions to configure the system to boot from any of the partitions. For purposes of the present discussion, this controlling partition will be referred to as the "Test Executive Software" or TES. The controlling partition 334 may be utilized in the identification and utilization of the various data images.

Figure 4:
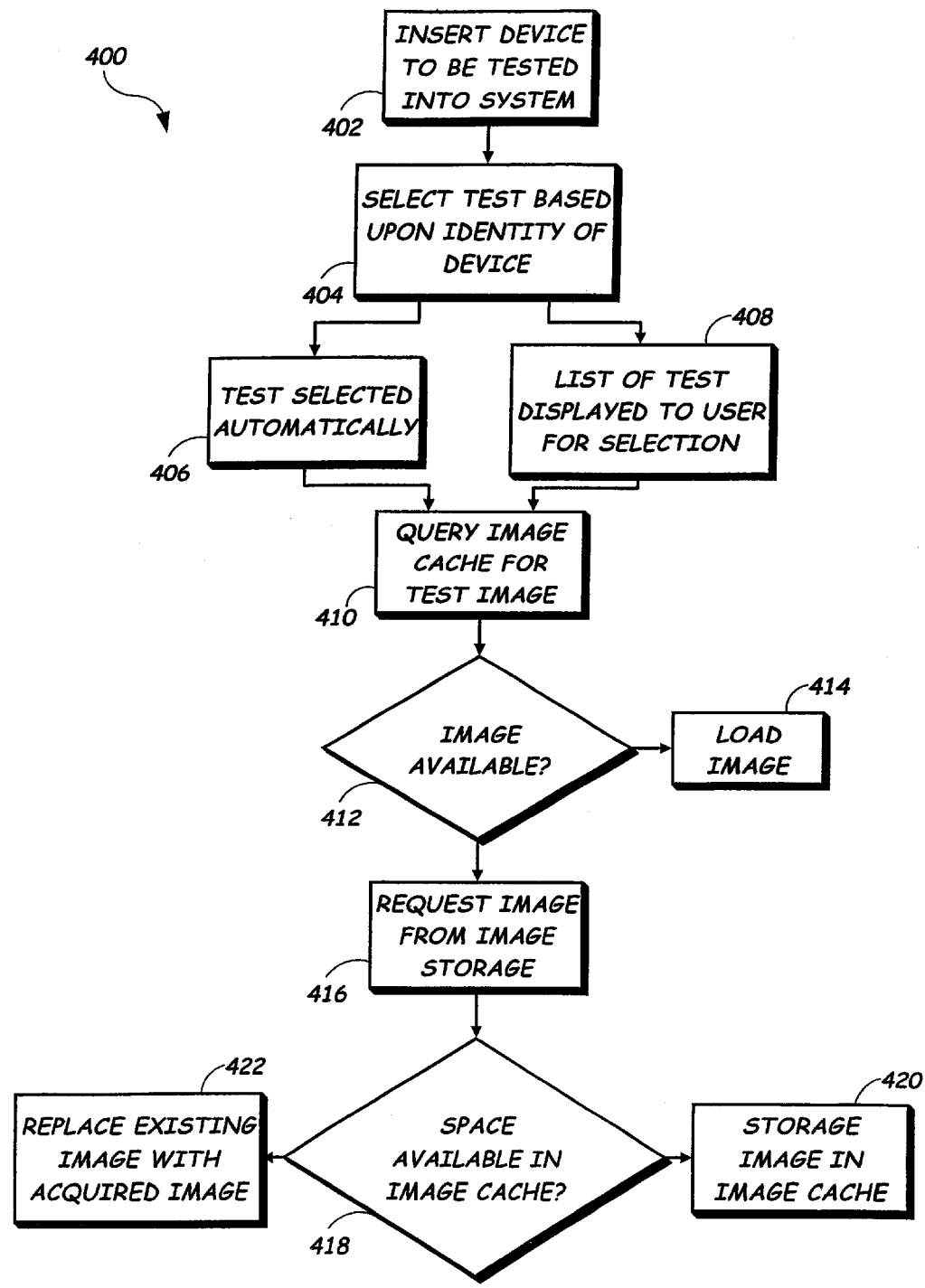
FIG. 4 is a flow chart depicting an exemplary method of the present invention wherein the usage of an image cache with data images in a testing system is shown.

Referring now to FIG. 4, an exemplary method 400 of the present invention is shown wherein an image cache is utilized with a testing system. To test a device, such as a component and/or information handling system, in a testing system, a device to be tested is inserted into the system 402 while the power is off. Subsequently, the system is powered up to identify the device and begin the testing process. It should be apparent that testing methods utilizing data images are also contemplated wherein the testing computer 328, 330 & 332 (FIG. 3) does not need to be powered off. A test is then selected based upon the identity of the device 404. For example, the device in the test slot may be automatically sensed by the TES and a test selected 406. Alternatively, a list of tests may be displayed to an operator and a test selected 408. The TES then provides an appropriate TestID and any other parameters required to test the device. The TestID may be utilized to identify the desired test data image.

A query is performed in the image cache 410 of the local system, such as by the image server and/or local system running TES, to determine if a desired data image, as identified through the selection process, is available in the image cache. If the data image is available 412, the data image is loaded 414. An identifier included on the data image may also be updated to reflect the usage and/or accessing of the data image, such as by time stamping the data image. If the data image is not available in the image cache, the data image may be requested from image storage 416, such as through a storage device included with the image server. The data image is then transferred from image storage to the image cache. A determination may be made if there is available storage on the image cache 418. If there is space available in the image cache, the data image is stored in the image cache 420. However, if there is insufficient capacity in the image cache 420, an existing data image on the image cache may be overwritten with the acquired data image 422. As stated earlier, a data image may be chosen for deletion in a variety of ways without departing from the spirit and scope of the present invention.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the image cache of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of storing data images, comprising:
   receiving a request for a data image;
   querying an image cache for the requested data image, wherein if the data image is not included in the image cache, querying an image storage for the requested data image, the image storage connected to the image cache over a network; and
   transferring the requested data image to the image cache from the image storage, wherein when there is insufficient storage space to store the requested data image on the image cache, a preexisting data image is deleted;
   wherein a controlling partition is included with a plurality of data images to indicate a data image to be utilized; and
   wherein the controlling partition is test executive software and the data image comprises test instructions controlled by said test executive software.

2. The method as described in claims 1, wherein at least two data images are included on the image cache, the data image to be deleted is selected based upon which data image has not been accessed for a longer period of time.

3. The method as described in claim 1, wherein the data image included on the image cache is deleted due to insufficient storage space for the transferred data image.

4. The method as described in claim 1, wherein the data image includes an identifier suitable for at least one of identifying the data image, indicating usage of the data image, indicating access of the data image, time stamping and indicating a function of the data image.

5. The method as described in claim 1, wherein at least two data images are included on the image cache, the data image to be deleted is selected based upon which data image has been accessed the least number of times while on the image cache.

6. The method as described in claim 1, wherein the data image includes an identifier that indicates the number of times the data image was accessed in a given period of time.

7. The method as described in claim 1, and further comprising the step of executing a test of a device by the test executive software of the controlling partition using the test instructions of the requested data image in the image cache.

8. The method as described in claim 1, wherein the test executive software comprises a program of instructions to configure a system to boot from one data image of the plurality of data images.

9. The method as described in claim 1, wherein the test executive software of the controlling partition is capable of being used to identify and utilize one data image of the plurality of data images for testing a device.

10. The method as described in claim 1, wherein the test executive software of the controlling partition is capable of indicating which data image of the plurality of data images to utilize to test a device.

11. The method as described in claim 1, wherein the test instructions are capable of being used to conduct testing of a device.

12. A system suitable for transferring data images, comprising:
   an information handling system including an image cache suitable for being accessed locally, the image cache suitable for storing at least one data image; and
   an image server including image storage, the image server connected to the information handling system over a network, the image storage including a plurality of data images,
   wherein a plurality of data images transferred from the image server are utilized by the information handling system, a first data image is stored on the image cache which is utilized more recently by the information handling system than a second data image;
   wherein a controlling partition is included with the plurality of data images to indicate a data image to be utilized; and
   wherein the controlling partition is test executive software and the data image comprises test instructions controlled by said test executive software.

13. The system as described in claim 12, wherein the transferred image is stored on the image cache and at least one data image included on the image cache is deleted.

14. The system as described in claim 13, wherein at least two data images are included on the image cache, the data image to be deleted is selected based upon which data image has not been accessed for a longer period of time.

15. The system as described in claim 13, wherein the data image included on the image cache is deleted due to insufficient storage space for the transferred data image.

16. The system as described in claim 12, wherein the data image includes an identifier suitable for at least one of identifying the data image, indicating usage of the data image, indicating access of the data image, time stamping and indicating a function of the data image.

17. The system as described in claim 12, wherein a plurality of data images is stored on partitions of a hard disk.

18. A method of testing a device on a testing system utilizing data images stored on an image server and an image cache, comprising:

determining an identity of the device;

selecting a test based upon the identity of the device;

identifying a data image appropriate for testing the device;

requesting the data image from the image cache, wherein if the data image is not included in the image cache, querying an image storage for the requested data image, the image storage being connected to the image cache over a network;

transferring the requested data image to the image cache from the image storage, wherein when there is insufficient storage space to store the requested data image on the image cache, a preexisting data image is deleted;

determining if there is sufficient storage space on the image cache to store the requested data image thereon;

deleting a data image preexisting on the image cache when there is insufficient storage space on the image cache to store the requested data image thereon;

loading the data image onto the testing system from the image cache; and executing a test of the device by the testing system using the requested data image in the image cache.

19. The method as described in claim 18, wherein said step of determining the identity of the device includes automatically sensing the identity of the device by test executive software on a controlling partition on the image server.

20. The method as described in claim 19, additionally comprising providing a test identification by the test executive software.

21. The method as described in claim 20, wherein the step of identifying the appropriate data image includes using the test identification provided by the test executive software.

22. The method as described in claim 18, additionally comprising creating an identifier for the data image stored on the image cache, wherein the identifier is included on the data image.

23. The method as described in claim 22, additionally comprising updating the identifier included on the data image to reflect accessing of the data image.

24. The method as described in claim 23, wherein said step of updating includes time stamping the data image.

* * * * *